Oct. 8, 1957 H. H. SCHOTT 2,808,775
COMBINATION BEVERAGE MAKER
Filed June 17, 1954 2 Sheets-Sheet 2

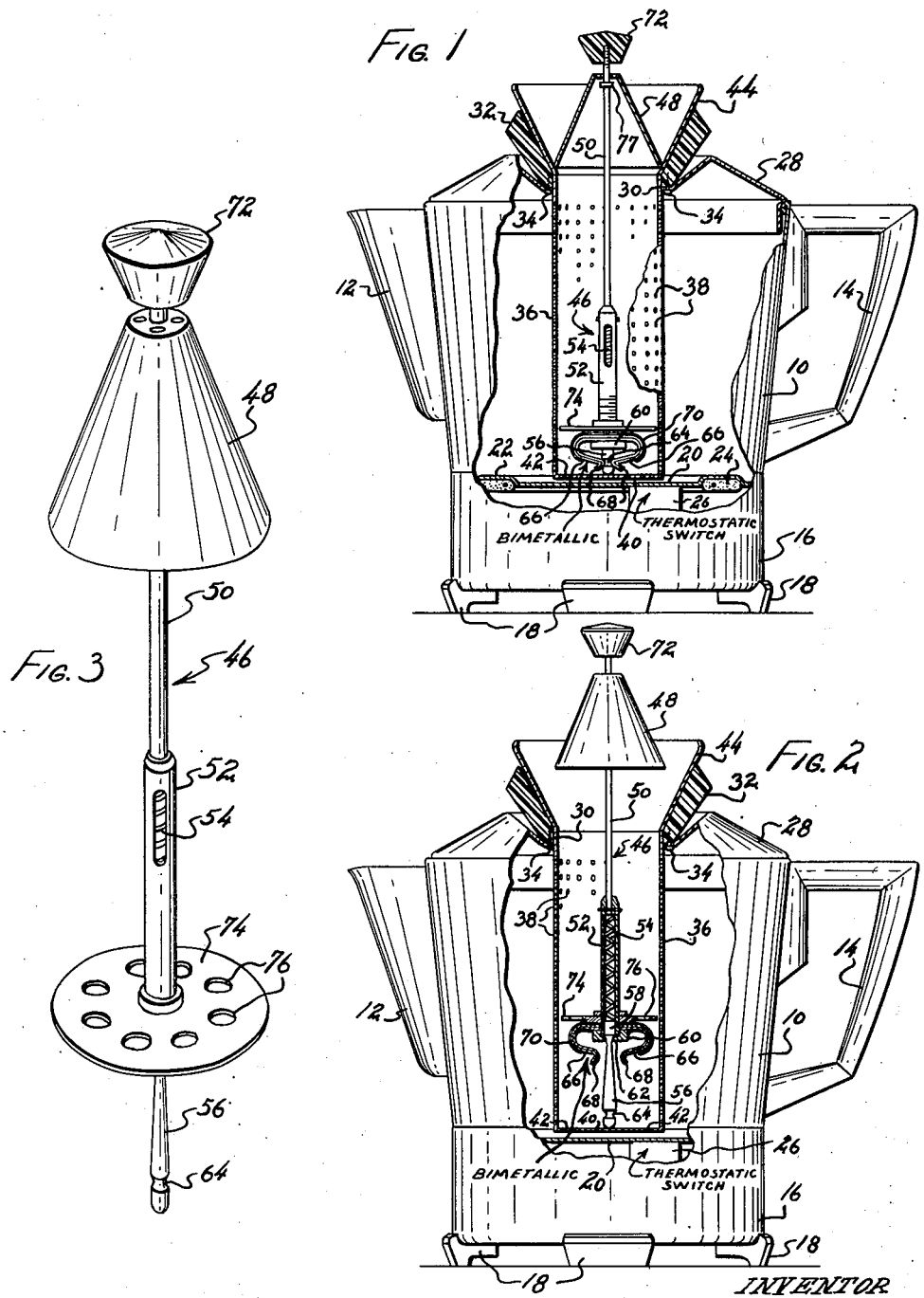

INVENTOR
HOWARD H. SCHOTT
BY Stuart R. Peterson
ATTORNEY

United States Patent Office 2,808,775
Patented Oct. 8, 1957

2,808,775

COMBINATION BEVERAGE MAKER

Howard H. Schott, St. Paul, Minn., assignor to General Mills, Inc., a corporation of Delaware Application June 17, 1954, Serial No. 437,380

4 Claims. (Cl. 99—283)

This invention relates in general to beverage making devices, and pertains more particularly to a multiple purpose device capable of making either instant coffe, percolated coffee, or tea.

The consumption of instant coffee has increased so rapidly in recent years that it now constitutes a sizeable percentage of all coffee used in this country. While the making of instant coffee is simple by comparison with the usual drip, vacuum or percolating methods, nonetheless there is a certain amount of bother in the preparation of this newer type of beverage, for care must be exercised to heat the water to a sufficiently elevated temperature so that the powdered coffee will be properly dissolved when the water is poured thereover. On the other hand, if the water is heated to too hot a temperature, the drinker must wait for the beverage to cool enough. Further difficulty is encountered if the user is in the habit of desiring a second cup of coffee, because then the water for making the second cup must be kept at a powder dissolving temperature rather than a lower, drinking temperature as would be the case if the coffee were all prepared at one time. If an attempt should be made to prepare another cup of coffee with the first by utilizing a second cup with powdered coffee and water therein, then the second cup will in all likelihood cool below a palatable temperature before it is needed.

With the foregoing difficulties in mind it can be seen that there is a need for a better way of making instant coffee. Accordingly, the invention has for an object the making of instant coffee in an automatic or semiautomatic fashion. More specifically, the invention contemplates the release of the powdered instant coffee so that it will fall into the heated water at just the right water temperature. Means are also provided by which the agitation or mixing of the beverage is facilitated within the vessel so that when the beverage is poured it will be of a uniform quality. Also, it will be appreciated that once the powdered coffee and heated water have been blended together the beverage thus formed may be retained at a lower, drinking temperature in contradistinction to the higher temperature at which the water itself would have to be held to provide complete dissolvement of the powder.

While one object of the invention is to facilitate the making of instant coffee, the invention also recognizes that those persons using instant coffee do not necessarily use this form all the time. Frequently, instant coffee is employed chiefly as a matter of convenience and when ample time is available, then the consumer is desirous of infusing coffee to his own taste from his own preferred brand or blend of ground coffee. Therefore, it is a further object of the invention to provide a beverage making device that is so equipped that percolated coffee can also be made without a complicated changeover of parts.

Not only does the invention make provision for producing both of the foregoing type of coffee, but it is also an aim of the invention to permit the steeping of tea in the device, particularly since there has been a recent trend toward increased tea drinking by those who are also coffee drinkers. Accordingly, a feature of the invention resides in the dual utilization of the instant coffee making mechanism for the making of tea.

Other objects will be in part obvious, and in part pointed out more in detail hereinafter.

The invention accordingly consists in the features of construction, combination of elements and arrangement of parts which will be emplified in the construction hereafter set forth and the scope of the application of which will be indicated in the appended claims.

In the drawings,

Figure 1 is an elevational view mainly in section showing the beverage maker arranged for the making of one beverage;

Fig. 2 is a view corresponding substantially to Fig. 1 but showing the beverage maker in a different operative position;

Fig. 3 is an enlarged perspective view of the valve assembly forming an important part of the invention;

Figure 4:
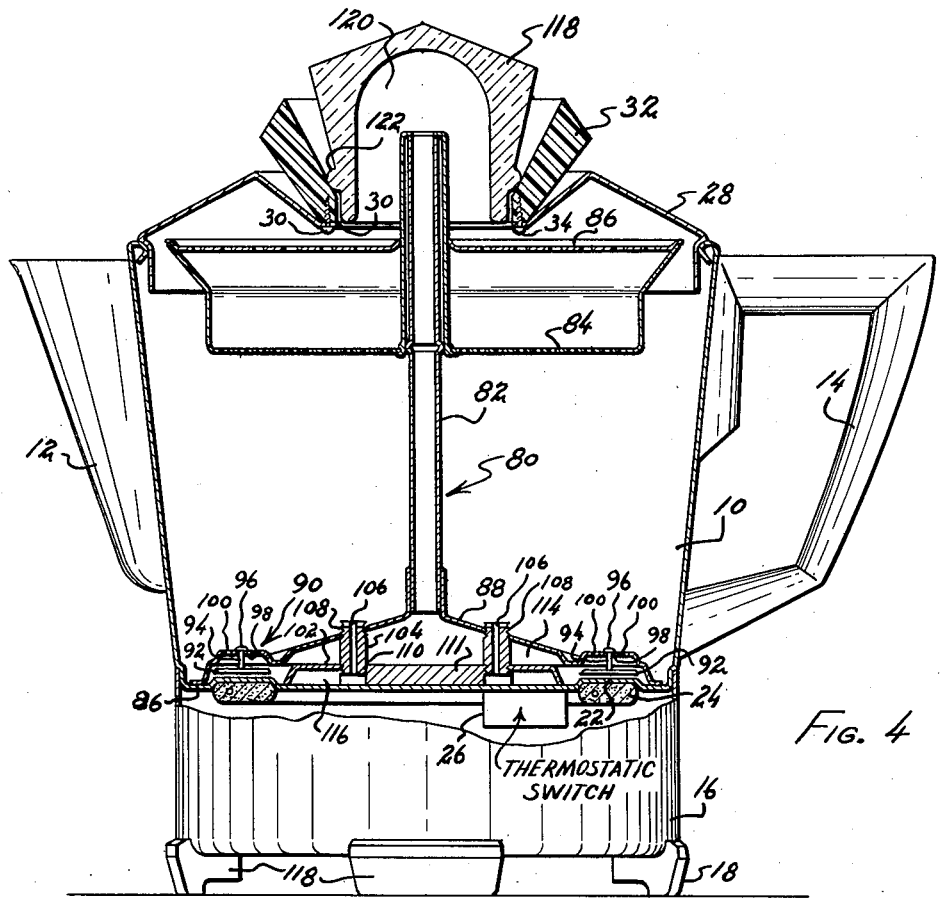
Fig. 4 is an elevational view with the beverage maker arranged for making a different beverage from that of Fig. 1.

Referring in detail to the drawings, the apparatus selected for exemplifying the instant invention comprises a vessel 10 equipped with a pouring spout 12 and a handle 14. Extending downwardly at the lower end of the vessel is a skirt 16 provided with a plurality of angularly spaced insulating feet 18. The bottom of the vessel 10, designated specifically by the reference numeral 20, has an annular, embossed or raised portion 22 and nested on the under side of the annulus 22 is a conventional electric heating element 24 of the calrod variety. For the purpose of controlling the energization of the heating element 24 there is provided a thermostatic switch 26 in circuit with the heating element, this thermostatic switch being in good heat transfer relation with that portion of the bottom 20 lying innerjacent the raised portion 22. Inasmuch as the heating element 24 and the thermostatic switch 26, as well as their associated circuitry, are all well known, there is no necessity for picturing these elements in detail. However, for a satisfactory circuit arrangement, reference may be had to U. S. Patent 2,076,096, granted on April 6, 1937, to A. O. Samuels et al., which patent shows in addition to the main heating element an auxiliary heating element for the purpose of maintaining the beverage at a suitable drinking temperature. At the upper end of the vessel 10 there is an annular cover 28 having a central aperture 30, while superjacent the border of the aperture 30 there is a gasket member 32 made preferably of rubber or plastic material, this gasket member being secured to the cover 28 as by a plurality of screws 34.

Up to this point the structure described is common to Figures 1, 2, and 4. Directing attention specifically to Figs. 1, 2, and 3, however, it is to be noted that the beverage maker is arranged for the making of instant coffee. To achieved this aim the invention envisages the utilization of a cylindrical shell or receptacle 36 having numerous apertures or perforations 38. The shell 36 has a substantially closed bottom wall 40 which may contain apertures 42 similar to the apertures 38. Flared outwardly from the upper end of the shell 36 is a flange 44, the flange being of a size to fit within the gasket 32 so that the shell 36 depends downwardly through the aperture 30 of the cover 28.

Inasmuch as it is intended that the structure depicted in Figs. 1 and 2 be employed in the making of instant coffee, the invention has in view the use of a valve mechanism designated in its entirety by the reference numeral 46. It will be observed that the valve mechanism 46 includes an inverted conical valve member 48 designed to seat within the flared flange 44. The valve member 48 is loosely supported on a valve stem 50 which extends downwardly into the upper end of a sleeve 52, the two members being secured together as by brazing or riveting to form one of two telescoping elements. It will of course be recognized that the stem 50 and the sleeve 52 might constitute a single member. Within the sleeve 52 and in encircling relation with the valve stem 50 is a coiled spring 54. The purpose of the spring 54 is to urge a lower valve stem 56 outwardly with respect to said sleeve 52. Complete ejection of the lower valve stem 56 is prevented, however, by reason of an enlarged head 58 and a nut member 60 having an inwardly directed flange 62. From an inspection of Fig. 2, this arrangement can be plainly seen and in assembling the parts it will be appreciated that the head 58 is larger than the lower end of the stem 56 so that the stem may be inserted downwardly through the nut member 60 before the nut member is threaded into place on the lower end of the sleeve 52.

Near the lower end of the stem 56 is a circumferential groove 64. Cooperating with this groove are the free ends of a pair of bimetallic elements or fingers 66, both of which have their upper ends fixedly anchored with respect to the sleeve 52. The free ends are reversely turned as indicated by the numeral 68 and these ends engage in the groove 64 to form a latch arrangement which is instrumental in retaining the valve stem 36 in a telescoped relation with the sleeve 52. Obviously the bimetallic elements 66 must exert in a cool condition sufficient pressural force so that the ejecting action of the spring 54 is overcome, and aiding in the production of such pressural force is a pair of curved leaf springs 70 conforming substantially to the curvature of the bimetallic elements or fingers 66. It is also to be observed that the surface of the lower stem 56 tapers upwardly and inwardly from the groove 64 so that when the bimetallic fingers 66 expand sufficiently due to the water within the vessel 10 having reached a predetermined temperature, then there is no frictional interference which would hamper the ejective action of the spring 54. However, this feature will be described more fully in conjunction with the hereinafter set forth operational sequence.

In order to facilitate handling of the valve mechanism 46 there is secured at the upper end of the valve stem 50 a knob or handle 72. Not only does the knob 72 permit ready manipulation of the valve mechanism 46 into position for making instant coffee, but said knob also provides an easy means for reciprocating the entire valve mechanism for the purpose of agitating the powdered coffee after it has been dumped down into the confines of the cylindrical shell 36. Since agitation of the liquid is contemplated, such agitation can be accelerated by reason of a flange or disc 74 secured to the sleeve 52. This flange or disc 74 is provided with a series of apertures 76 so that the disc acts as a plunger when the mechanism 46 is reciprocated vertically by manually raising and lowering the knob 72. Another function performed by the knob 72 is to limit upward movement of the conical shell or valve member 48, a collar 77 affixed to the stem 50 limiting movement in an opposite direction.

Figure 5:
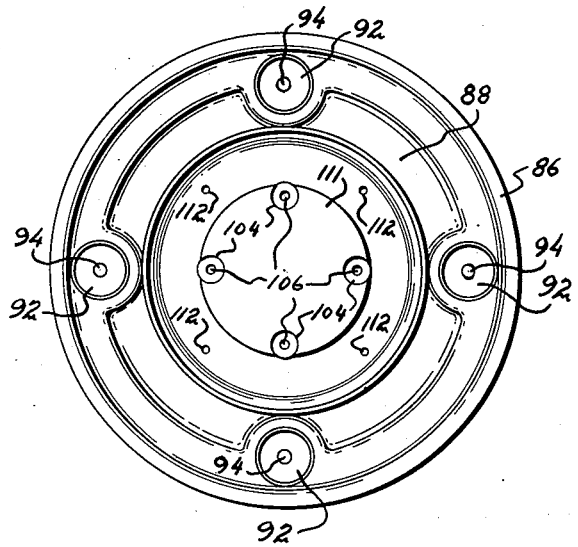
Fig. 5 is a bottom plan view of the pump assembly shown in elevation in Fig. 4.

Before describing in detail the structure set forth in Figs. 4 and 5, perhaps an explanation of the operation of the structure presented up to this point will be of help. Assuming that the valve mechanism 46 has been inserted into the sleeve 36 as shown in Fig. 1, with the lower stem 36 telescoped within the sleeve 52 to compress thereby the spring 54 and concomitantly therewith engage the free ends of the bimetallic fingers 66 within the circumferential groove 64, then when so arranged, powdered coffee can be placed in the hopper formed between the flared flange 44 and the conical valve member 48, the quantity depending upon the amount of coffee desired. Usually there will be used a teaspoon of powdered coffee for each cup of water placed in the vessel 10. After these preliminary steps have been taken, the beverage maker is then ready for operation and energization of the heating element 24 in conjunction with the thermostatic switch 26 is responsible for elevating the temperature of the water within the vessel. When the water has reached a predetermined temperature by reason of the bimetallic characteristics of the fingers 66, it will be understood that these fingers flex outwardly (Fig. 2) so that the gripping action of the ends 68 is relaxed sufficiently so that they become disengaged from the groove 64. This course of action immediately permits the lower stem 56 to move downwardly by virtue of the action of the coil spring 54. Since it is contemplated that the lower tip of the stem 56 be either in contact with the bottom 40 of the sleeve 36 or spaced slightly above, it can be seen that this downward movement of the stem 56 acts against the bottom 40 with such force that the valve member 48 is rapidly thrust upwardly. Due to the upward movement of the valve member 48, the powdered coffee is permitted to fall down into the perforated sleeve or receptacle 36 and once in the water starts to dissolve. In order to thoroughly dissolve the powdered coffee in the water and at the same time produce a uniform beverage, it is recommended that the composite liquid and powdered coffee be agitated. This is accomplished by merely raising and lowering the knob 72, such action causing the apertured disc 74 to move upwardly and downwardly in piston-like fashion within the confines of the perforated shell 36.

From the above description of the instant coffeemaking feature, it can be readily discerned that once the sleeve 36 and the pump mechanism 46 have been inserted into place together with the addition of powdered coffee to the hopper space formed by the members 44 and 48, an automatic or semiautomatic operation ensues without further attention from the user, for the powdered coffee will be permitted to fall into the water once the water has reached the proper temperature.

It might be explained at this time that the beverage maker is also useable for the steeping of tea and all that is necessary in achieving this end is to remove the valve mechanism 46, placing the tea leaves within the perforated sleeve 36 so that the water as it becomes heated will extract the flavor from the tea leaves. In some situations, depending primarily upon individual taste, it will be desired that the tea be subjected to the action of the hot water only after the water has come up to a preferred elevated temperature. In such situations, the sleeve 36 can be injected into the water after the water has become heated. Also it is within the realm of possibility to utilize the valve mechanism 46 for the introduction of the tea leaves downwardly into the perforated sleeve 36 when the water has reached a desired temperature.

Taking cognizance of the fact that many people who drink instant coffee also desire at times to infuse coffee from ground coffee beans, the invention also has as a desideratum the idea of making coffee by the well known percolating method. Therefore attention is now directed specifically to Figs. 4 and 5. In Fig. 4 it will be observed that the percolating pump mechanism has been designated in its entirety by the reference numeral 80 and comprises a fountain tube 82 which supports a perforated basket 84 at its upper end, the perforated basket having a removable similarly perforated cover 86. The lower region of the pump mechanism 80 includes an outer upwardly concave flange 88 secured to the bottom of the tube 82. Spaced near the periphery of the flange 88 is a plurality of valve units 90, these valve units consisting of a disc 92 having an upstanding stem 94 and a head 96, the stem extending through an aperture 98 in the flange 88 in each instance. Also included as a part of the valve units is a series of apertures 100 radially spaced with respect to each aperture 98. Still further included as part of the pump mechanism 80 is an inner concave flange bearing the numeral 102.

This latter flange receives its support by reason of a plurality of tubular members 104 each having a bore 106 extending therethrough. By having the upper end threadedly engaged with the flange 88 at 108 and the lower end threadedly engaged with the flange 102 at 110, it can be seen that the desired spaced relationship is attained. Desirably, the entire pump unit 80 is weighted by a relatively heavy disc member 111, and the lower ends of the tubular members 104 may threadedly extend thereinto.

As better observed in Fig. 5, the flange 102 contains a series of apertures 112 which are disposed on radial lines lying intermediate those lines on which the bores 106 reside, the purpose for which will presently be explained in greater detail. However, at this time it is to be discerned that the flanges 88 and 102 by virtue of their spaced relationship form, when resting on the bottom 20 of the vessel 10, a chamber 114. Also a central chamber 116 is produced owing to the concavity of the flange 102. Actually the flanges 88 and 102 are concentric with each other and are of such dimensions as to cause these flanges when resting upon the bottom 20 of the vessel to straddle the annular, embossed portion 22. In this way the chamber 114 is subjected to concentrated heat in the vicinity of the raised portion 22, for the heating element 24 is contiguous the under side of said raised portion.

Encircling the upper end of the fountain tube 82 in a manner so that water pumped up the tube will flow downwardly into the coffee grounds contained in the basket 84 is a dome member 118. This dome member has a recess 120 facing downwardly for the accommodation of the upper end of the fountain tube 82. As pictured in Fig. 5 the dome member 118 is designed to be supported by the gasket 32, there being a peripheral flange 122 which provides a gravity produced sealing relationship with said gasket 32. Also if desired, but not shown in the drawing, a suitable bayonet and slot arrangement may be employed in order to anchor the dome member during a percolating operation.

While percolators of the general variety above described are old and well known, nonetheless the instant pump mechanism 80 is felt to possess novelty in its structure and operation. To demonstrate, a brief operational sequence will now be presented. Having placed the coffee grounds in the basket 84, the heating element 24 is energized by reason of the thermostatic switch being at a relatively cool temperature. As the water contained in the vessel 10 heats up, the generation of steam and vapor within the compartment 114 is instrumental in closing the various valve units 90, the pressure built up within the chamber 114 urging the discs 92 upwardly into sealing relationship with the apertures 100. As in conventional percolators the pressure will decrease spasmodically as the water is pumped upwardly via the fountain tube 82, thereby permitting ingress of additional water through the apertures 100 as the discs 92 drop by gravity action. However, since the thermostatic switch 26 lies innerjacent the heating element 24 and is in good heat transfer relationship with the bottom 20, it is exceedingly desirable that the pocket or chamber 116 not entrap water which would be stagnant and therefore influenced to a more pronounced degree temperature-wise than the major portion of the water above the flange 88 as well as the mixture of water, steam, and vapor contained in the chamber 114. With this in mind, it is an aim of the invention to provide a certain amount of circulation of water through the chamber 116 thereby avoiding the above alluded to stagnant condition. It is in this respect that the bores 106 in conjunction with the apertures 112 play a very important role, for the bores 106 permit the downward flow of water from the interior of the vessel 10 into the chamber 116 and then upwardly through the openings 112 into the chamber 114. From the chamber 114 such flow of water will proceed upwardly through the fountain tube 82. These apertures 106 and 112 are not large enough to hamper the percolating action from a practical standpoint and are actually very helpful in providing a more uniform control of heat during the percolating procedure, since they prevent the thermostat from being adversely or improperly influenced. Another advantage stemming from the use of the tubular members 104 and their respective bores 106 stems from the fact that when the pump mechanism 80 is lowered into the water any air that might be entrapped under the inner flange 102 by virtue of its downwardly facing concavity is permitted to seek a ready avenue of escape upwardly via the bores 106.

From the preceding descriptive matter it will be readily observed that the invention has provided a multiple purpose beverage maker capable of making instant coffee, percolated coffee, or tea. Also it will be appreciated that these specific aims are accomplished in a very facile and inexpensive manner, yet without complication as far as switching from the making of one beverage to another is concerned.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specified features of the invention herein described and all statements of the scope of the invention which, as a matter of language, might be said to fall therebetween.

I claim:

1. In a beverage making device, a vessel for containing a liquid to be heated, hopper means disposed near the upper end of said vessel including an outwardly flaring flange and an inwardly tapering valve member having its larger end seatable with a portion of said flange so as to then prevent a beverage making substance from dropping into the liquid, means biasing said valve member upwardly including a pair of telescopically arranged members and a spring acting in a direction to extend said telescopically arranged members, one of said members reacting against a stationary portion of said device, and thermostatic means beneath said valve member for restraining said spring and thus permitting said valve member to remain in a seating position until the liquid in said vessel has reached a predetermined temperature whereupon said spring is permitted to open said valve and thus allow said substance to drop into said liquid.

2. In a beverage making device, a vessel for containing a liquid to be heated, a perforated receptacle supported by said vessel and depending into the liquid contained in said vessel, said receptacle having an open upper end and a substantially closed bottom end, a valve member for closing said open end to prevent a supply of beverage making substance from dropping into the liquid contained in said vessel, a pair of elongated telescoping elements, the upper of which is connected to said valve member and the lower of which is engageable with the bottom end of said receptacle, a spring urging said telescoping elements into an extended relation to cause the lower of said elements to engage the bottom of said receptacle thereby to cause said valve member to be raised to open the upper end of said receptacle and permit the beverage making substance to drop into said liquid and thermostatic means carried by said upper element normally engaging the lower element to prevent extension of said elements, said thermostatic means acting to release said elements when the liquid has reached a predetermined temperature whereby the spring is permitted to extend said elements to open said valve member.

3. A beverage making device in accordance with claim 2 in which one of said telescoping elements is equipped with an apertured flange for permitting agitation of the liquid after release of said beverage making substance by reason of the opening of said valve member.

4. In a beverage making device, a vessel for containing a liquid to be heated, an annular cover for said vessel having an aperture therethrough, a perforated cylindrical shell having an outwardly flaring open upper end and a substantially closed lower end, said shell depending through said aperture and supported by said cover, an inverted conical valve member seatable against the upper end of said cylindrical shell for closing said open end to prevent a supply of beverage making substance from dropping into the liquid contained in said vessel, a pair of elongated telescoping elements, the upper of which is connected to said valve member and the lower of which is engageable with the bottom of said receptacle in an extended condition of said elements, a spring urging said telescoping elements into said extended condition to cause said valve member to be raised to open the upper end of said shell and permit the beverage making substance to drop into said liquid, and a pair of bimetallic, arcuate fingers carried by the upper element, said lower element being provided with an annular groove into which the free ends of said fingers grip to prevent extension of said elements, whereby sufficient warpage of said fingers due to the liquid reaching a predetermined temperature will relax the grip on the lower element to permit extension of said elements and opening of said valve member.

References Cited in the file of this patent

UNITED STATES PATENTS

| | | |
|---|---|---|
| 913,293 | Holley | Feb. 23, 1909 |
| 1,009,142 | Ferrall | Nov. 21, 1911 |
| 1,508,809 | White | Sept. 16, 1924 |
| 1,920,013 | Green | July 25, 1933 |
| 1,971,758 | Olds | Aug. 28, 1934 |
| 2,012,645 | Thomas | Aug. 27, 1935 |
| 2,109,363 | Williams | Feb. 22, 1938 |
| 2,122,046 | Rosenheimer | June 28, 1938 |
| 2,447,692 | Evensen | Aug. 24, 1948 |
| 2,498,386 | Alexander | Feb. 21, 1950 |
| 2,601,943 | Torrese | July 1, 1952 |

FOREIGN PATENTS

| | | |
|---|---|---|
| 203,502 | Great Britain | Sept. 13, 1923 |
| 835,025 | Germany | Mar. 27, 1952 |